US006944300B2

(12) United States Patent
Challener et al.

(10) Patent No.: US 6,944,300 B2
(45) Date of Patent: Sep. 13, 2005

(54) METHOD FOR MIGRATING A BASE CHIP KEY FROM ONE COMPUTER SYSTEM TO ANOTHER

(75) Inventors: David Carroll Challener, Raleigh, NC (US); Hernando Ovies, Cary, NC (US)

(73) Assignee: International Business Machines Corporaton, Armonk, NY (US)

(*) Notice: Subject to any disclaimer, the term of this patent is extended or adjusted under 35 U.S.C. 154(b) by 923 days.

(21) Appl. No.: 09/888,176

(22) Filed: Jun. 22, 2001

(65) Prior Publication Data

US 2002/0196946 A1 Dec. 26, 2002

(51) Int. Cl.$^7$ .............................. H04L 9/00
(52) U.S. Cl. .................. 380/277; 380/278; 380/283; 380/262
(58) Field of Search .............. 705/66, 76; 380/228, 380/278, 262, 277, 283; 713/156, 201

(56) References Cited

U.S. PATENT DOCUMENTS

| | | | |
|---|---|---|---|
| 5,557,346 A | | 9/1996 | Lipner et al. |
| 5,666,415 A | | 9/1997 | Kaufman |
| 5,745,576 A | * | 4/1998 | Abraham et al. ............ 705/73 |
| 5,787,172 A | | 7/1998 | Arnold |
| 5,991,406 A | | 11/1999 | Lipner et al. |
| 6,038,322 A | * | 3/2000 | Harkins ................. 380/279 |
| 6,160,890 A | * | 12/2000 | Tatebayashi et al. ........ 380/277 |
| 6,192,130 B1 | * | 2/2001 | Otway ................... 380/277 |
| 6,215,878 B1 | * | 4/2001 | Harkins ................. 380/281 |
| 6,711,263 B1 | * | 3/2004 | Nordenstam et al. ....... 380/282 |

FOREIGN PATENT DOCUMENTS

| | | |
|---|---|---|
| DE | 19523466 | 4/1997 |
| EP | 0855815 A2 | 7/1998 |

OTHER PUBLICATIONS

Freier et al. "The SSL Protocol", Mar. 1996, version 3, Netscape Communications.*

* cited by examiner

Primary Examiner—Gregory Morse
Assistant Examiner—Thomas Ho
(74) Attorney, Agent, or Firm—George E. Grosser; Carlos Munoz-Bustamante; Dillon & Yudell LLP

(57) ABSTRACT

A method for migrating a base chip key from a first computer system to a second computer system is disclosed. A first computer system includes a base chip key 1, and a second computer system includes a base chip key 2. Using a first certificate for the base chip key 1, a manufacturer of the second computer system generates a second certificate for the base chip key 1. Similarly, using a first certificate for the base chip key 2, a manufacturer of the first computer system generates a second certificate for the base chip key 2. A first data packet is then sent from the first computer system to the second computer system. The first data packet includes a first random number and all the data required to reproduce the base chip key 1 in the first computer system. The first data packet is also encrypted with the base chip key 1's public key. In return, a second data packet is sent from the second computer system to the first computer system, and the second data packet includes the first random number and a second random number, signed by the base chip key 2. The base chip key 1 is then erased from the first computer system. Finally, the base chip key 2 in the second computer system is replaced by the base chip key 1.

12 Claims, 2 Drawing Sheets

METHOD FOR MIGRATING A BASE CHIP KEY FROM ONE COMPUTER SYSTEM TO ANOTHER

BACKGROUND OF THE INVENTION

1. Technical Field

The present invention relates to data processing in general, and in particular to a method for migrating information between computer systems. Still more particularly, the present invention relates to a method for migrating a base chip key from a first computer system to a second computer system.

2. Description of the Prior Art

A public-private key pair is a set of two keys with which one is required to decrypt the other. For example, a public key is required to decrypt a private key and vice versa. Each of the two keys within a public-private key pair acts as an inverse function to each other in much the same way as a square and a square-root function do. But unlike a mathematical inverse function, a private key cannot be computationally derived from a public key, and vice versa. Generally speaking, public-private key pairs are commonly used for three purposes. First, data encryption-information sent to a receiver can be encrypted using the receiver's public key so only the receiver can decipher the information. Second, data authentication-data sent by a sender can be signed by the sender's private key to prove the data was actually from the sender. Third, certification-a public key along with its owner is signed by a Certificate Authority to generate a certificate guaranteeing that the public key does belong to the owner of the private portion of a private/public key pair.

In order to ensure the privacy of private keys, the computer industry inclines to store private keys in hardware, such as a security chip. Stored private keys are never exposed to the system memory area of a computer system, and thus, stored private keys are protected from exposure to any unauthorized users. Because of the versatility of private keys, a computer user probably wants to have many private keys in his/her computer system. But due to the relatively high cost of storing a large number of private keys in a security chip, a daisy chain method of storage is utilized to store a large number of private keys in a single computer system. For example, only one private key, typically known as the base chip key, is stored persistently on a security chip, and all other private keys are stored in a hard disk after being encrypted using a public key whose private key to which the security chip has access.

For security reasons, the base chip key of a computer system will be generated entirely inside a security chip of the computer system, so the base chip key never leaves the security chip. Thus, the security chip is the only entity able to decrypt and use other private keys stored in the hard disk of the associated computer system. Since some of those private keys may be used to uniquely identify the associated computer system, it is important to ensure that the base chip key cannot be "clonable" (i.e., duplicated) in another computer system. Otherwise, those private keys could no longer be used to prove the uniqueness of the computer system.

Nevertheless, sooner or later, a user may want to upgrade the computer system to a newer model that is faster and has more capabilities. Although all the private keys from the old computer system can be reissued for the new computer system and new certificates can be obtained for all the private keys on the new computer system when a user want to upgrade the computer system, it would be much easier for the user if he/she were able to simply move the base chip key from the old computer system to the new computer system. Then, all the private keys stored in the hard disk of the old computer system can also be effortlessly transferred to the hard disk of the new computer system.

The present disclosure provides a method for migrating a base chip key from an old computer system to a new computer system without winding up with two computer systems simultaneously having the same base chip key.

SUMMARY OF THE INVENTION

In accordance with a preferred embodiment of the present invention, a first computer system includes a base chip key 1, and a second computer system includes a base chip key 2. Using a first certificate for the base chip key 1, a manufacturer of the second computer system generates a second certificate for the base chip key 1. Similarly, using a first certificate for the base chip key 2, a manufacturer of the first computer system generates a second certificate for the base chip key 2. A first data packet is then sent from the first computer system to the second computer system. The first data packet includes a first random number and all the data required to reproduce the base chip key 1 in the first computer system. The first data packet is also encrypted with the base chip key 1's public key. In return, a second data packet is sent from the second computer system to the first computer system, and the second data packet includes the first random number and a second random number, signed by the base chip key 2. The base chip key 1 is then erased from the first computer system. Finally, the base chip key 2 in the second computer system is replaced by the base chip key 1.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

The present invention provides a method for migrating a base chip key from a first computer system to a second computer system. Each of the two computer systems is equipped with a security chip. Both computer systems are embedded with a respective public key from their respective manufacturer. Both computer systems are also embedded with an endorsement key along with a corresponding certificate generated by their respective manufacturer. The certificates are issued in accordance with the Trusted Computing Platform Alliance (TCPA) specification. Details of the TCPA specification can be found in the internet website: www.trustedpc.org, the pertinent portion of which is incorporated herein by reference.

Figure 1:
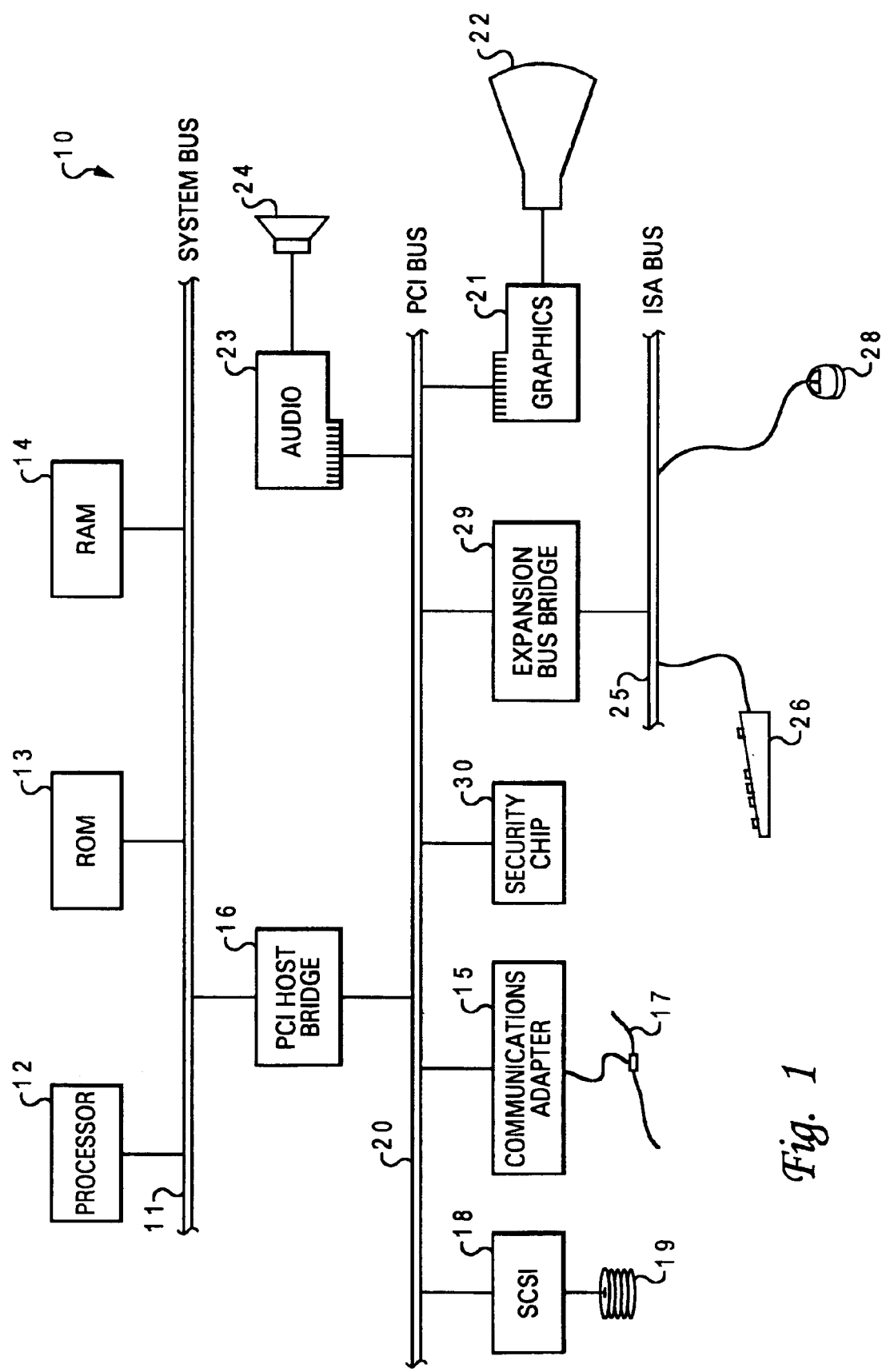
FIG. 1 is a block diagram of a computer system in which a preferred embodiment of the present invention is applicable.

Referring now to the drawings and in particular to FIG. 1, there is depicted a block diagram of a computer system 10 in which a preferred embodiment of the present invention is applicable. Computer system 10 is representative of both the first and the second computer system. The second computer system may be the next generation of the first computer system, although it does not have to be the case. As shown, a processor 12, a read-only memory (ROM) 13, and a random access memory (RAM) 14 are connected to a system bus 11. Processor 12, ROM 13, and RAM 14 are also coupled to a peripheral component interconnect (PCI) bus 20 of computer system 10 through a PCI host bridge 16. PCI host bridge 16 provides a low latency path through which processor 12 may directly access PCI devices mapped anywhere within bus memory and/or I/O address spaces. PCI host bridge 16 also provides a high bandwidth path allowing PCI devices to directly access RAM 14. In addition, an audio adapter 23 and a graphics adapter 21 may be attached to PCI bus 20. Graphics adapter 21 controls visual output through a video monitor 22 and audio adapter 20 controls audio output through a speaker 24. Also attached to PCI bus 20 is a communications adapter 15 and a small computer system interface (SCSI) 18. Communications adapter 15 connects computer system 10 to a local-area network (LAN) 17. SCSI 18 is utilized to control a high-speed SCSI disk drive 19. Expansion bus bridge 29, such as a PCI-to-ISA bus bridge, may be utilized for coupling an industry standard architecture (ISA) bus 25 to PCI bus 20. As shown, a keyboard 26 and a mouse 28 are attached to ISA bus 25 for performing certain basic I/O functions.

In addition, computer system 10 is equipped with a security chip 30 in which a base chip key may be stored. Security chip 30 allows for digital signature and/or any other authentication functions.

Figure 2:
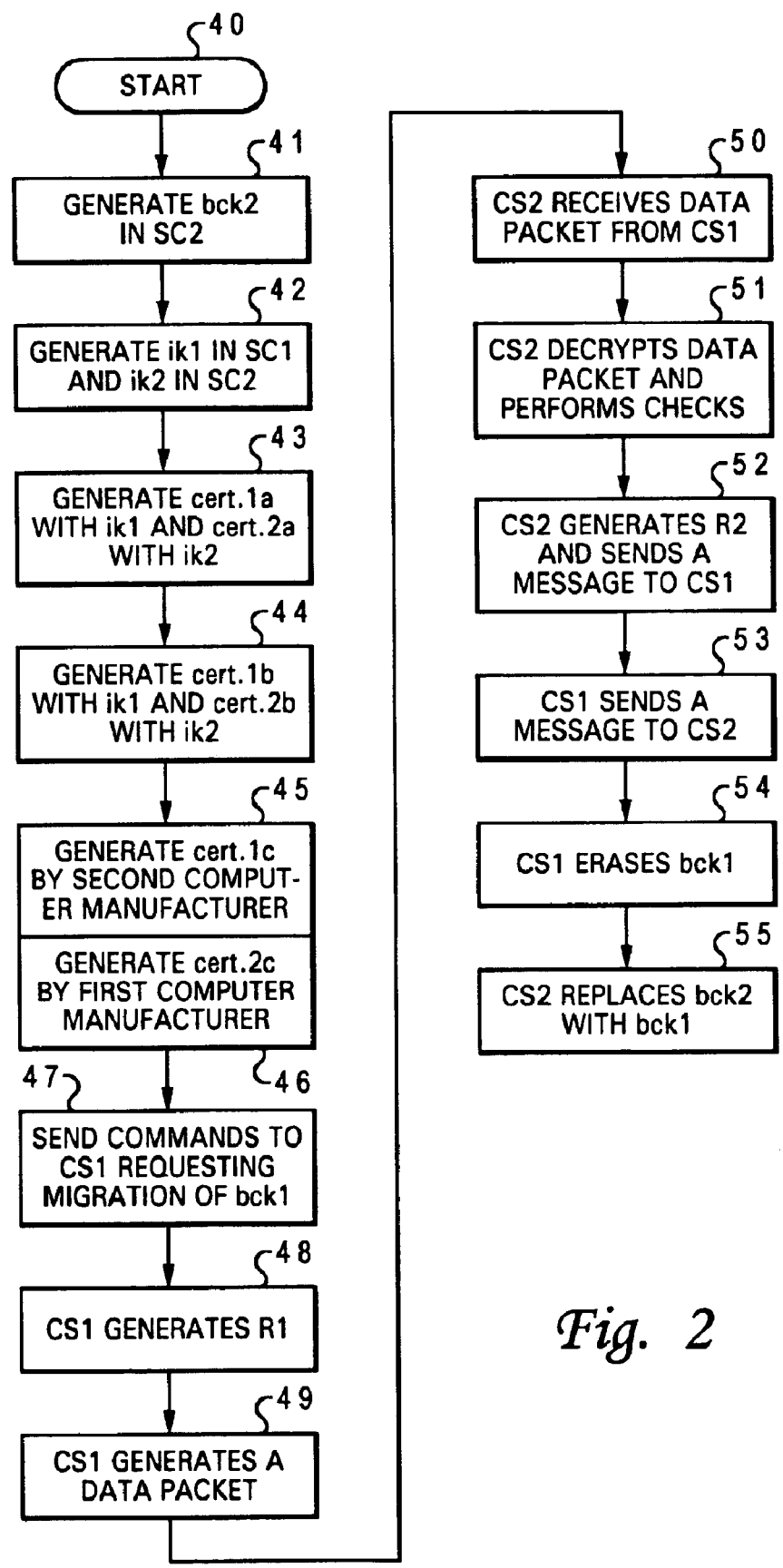
FIG. 2 is a high-level logic flow diagram of a method for migrating a base chip key from a first computer system to a second computer system, in accordance with a preferred embodiment of the present invention.

Suppose a base chip key 1 (bck 1) has been generated within a security chip 1 (sc 1) of the first computer system. With reference now to FIG. 2, there is illustrated a high-level logic flow diagram of a method for migrating base chip key 1 from the first computer system (cs 1) to the second computer system (cs 2), in accordance with a preferred embodiment of the present invention. Starting at block 40, a base chip key 2 (bck 2) is generated within a security chip 2 (sc 2) of the second computer system, as shown in block 41. The generation of base chip key 2 is performed within security chip 2 by a computer user using standard TCPA commands. Base chip key 2 is signed by a certified key that was embedded in security chip 2 by the manufacturer. The certified key is different for each security chip in every computer system.

Next, an identity key 1 (ik 1) is generated within the security chip 1 of the first computer system, and an identity key 2 (ik 2) is generated within the security chip 2 of the second computer system, as depicted in block 42. The generation of identity keys can be accomplished by the computer user using standard TCPA commands with the manufacturer of the corresponding security chip as the Certificate Authority. Identity key 1 (specifically the private portion) is utilized to generate a certificate for the first computer system (cert. 1a), and identity key 2 (specifically the private portion) is utilized to generate a certificate for the second computer system (cert. 2a), as shown in block 43. The certificates for the first and second computer systems are signed by their corresponding identity keys as root keys.

Then, identity key 1 (specifically the private portion) is utilized to generate a certificate for base chip key 1 (cert. 1b), and identity key 2 (specifically the private portion) is utilized to generate a certificate for base chip key 2 (cert. 2b), as depicted in block 44. The certificates for identify keys 1 and 2 are signed by their corresponding identity keys as root keys.

Next, base chip key 1, the certificate for the first computer system signed by identity key 1, and the certificate for the base chip key 1 signed by identify key 1 are send to the manufacturer of the second computer system. After receiving the above-mentioned three items, the manufacturer of the second computer system generates a certificate for base chip key 1 signed by the manufacturer of the second computer system (cert. 1c), as shown in block 45. The manufacturer of the second computer system then sends the certificate for base chip key 1 signed by the manufacturer of the second computer system back to the first computer system (or the owner of the first computer system). Similarly, base chip key 2, the certificate for the second computer system signed by identity key 2, and the certificate for the base chip key 2 signed by identify key 2 are send to the manufacturer of the first computer system. After receiving the above-mentioned three items, the manufacturer of the first computer system generates a certificate for base chip key 2 signed by the manufacturer of the first computer system (cert. 2c), as depicted in block 46. The manufacturer of the first computer then sends the certificate for base chip key 2 signed by the manufacturer of the first computer system back to the second computer system (or the owner of the second computer system). At this point, the first computer system has the certificate for base chip key 1 signed by the manufacturer of the second computer system, and the second computer system has the certificate for base chip key 2 signed by the manufacturer of the first computer system.

Subsequently, a migration command can be sent by the owner of the first computer system to the security chip 1 of the first computer system to request a migration of base chip key 1 to begin, as shown in block 47. The migration command is an authorized command, which means the owner of the first computer system is required to initiate the migration command. The migration command preferably includes the certificate for base chip key 2 signed by the manufacturer of the first computer system. The first computer system has a copy of the manufacturer's public key that was installed during manufacture. The first computer system verifies the certificate for base chip key 1. The first computer system then generates a random number, R1, to be used as a migration password for the migration attempt, as depicted in block 48, and the random number R1 is then export to the migrator.

The first computer system then generates a data packet that includes the random number R1 and all the data required to reproduce base chip key 1 on the first computer system, as shown in block 49, and the data packet is encrypted with base chip key 1's public key. The act of encryping the data packet with base chip key 1's public key ensures that only the first computer system can read the data packet. The second computer system receives the data packet from the first computer system, and also the random number R1 and the certificate that base chip key 1 is a root key, as depicted in block 50. The random number R1 is used as a password to prevent someone from using the encrypted data packet without permission of the owner of the first computer system. The second computer system decrypts the data packet, and then performs three different checks, as shown in block 51. First, the two copies of the random number R1 are checked to make sure they are the same. Second, the public key with the private key inside the data packet are checked. Third, the certificate are checked using its own copy of the manufacturer's public key. If there is a mismatch in any one of the above-mention three checks, the migration process halts immediately.

Next, the second computer system generates a random number, R2, and sends a message to the first computer system containing the random numbers R1 and R2, signed with base chip key 2, as depicted in block 52. After receiving the message from the second computer system, the first computer system verifies the message is indeed from the second computer system by using the signature (it still contains the public key that it has verified). At this point, the second computer system has a copy of base chip key 1.

The first computer system generates a message with base chip key 1, indicating it is erasing its copy of base chip key 1, as shown in block 53. The message preferably includes the random number R2. The first computer system signs the message, erases its copy of base chip key 1, as depicted in block 54, and then sends the message to the second computer system, as shown in block 55. At this point, the first computer system no longer has any copy of base chip key 1.

The second computer system has a copy but it is not yet active. After verifying the message is indeed from the first computer system, the second computer system replaces base chip key 2 with base chip key 1, as depicted in block 56. At this point, the second computer system has an active copy of base chip key 1. Base chip key 2 does not exist anywhere.

As has been described, the present invention provides a method for migrating a base chip key from a first computer system to a second computer system. With the present invention, even if a computer hacker copies all of the messages sent between the two computer systems and tries a replay attack, the nonce will not be the same. Thus, there will be no way of reactivating the base key chip 1 key inside of security chip 2.

It is also important to note that although the present invention has been described in the context of a fully functional computer system, those skilled in the art will appreciate that the mechanisms of the present invention are capable of being distributed as a program product in a variety of forms, and that the present invention applies equally regardless of the particular type of signal bearing media utilized to actually carry out the distribution. Examples of signal bearing media include, without limitation, recordable type media such as floppy disks or CD ROMs and transmission type media such as analog or digital communications links.

While the invention has been particularly shown and described with reference to a preferred embodiment, it will be understood by those skilled in the art that various changes in form and detail may be made therein without departing from the spirit and scope of the invention.

What is claimed is:

1. A method for migrating a base chip key from a first computer system to a second computer system, wherein said first computer system includes a base chip key 1, and said second computer system includes a base chip key 2, said method comprising:

generating a second certificate for said base chip key 1 by a manufacturer of said second computer system using a first certificate for said base chip key 1, and generating a second certificate for said base chip key 2 by a manufacturer of said first computer system using a first certificate for said base chip key 2;

sending a first data packet from said first computer system to said second computer system, wherein said first data packet includes all data necessary to reproduce said base chip key 1 in said second computer system;

sending a second data packet from said second computer system to said first computer system acknowledging the receipt of a copy of said base chip key 1;

erasing said base chip key 1 from said first computer system; and replacing said base chip key 2 in said second computer system with said base chip key 1.

2. The method of claim 1, wherein said first data packet includes a first random number.

3. The method of claim 1, wherein said first data packet is encrypted with said base chip key 1's public key.

4. The method of claim 1, wherein said second data packet includes said first random number and a second random number.

5. The method of claim 1, wherein said second data packet is signed by said base chip key 2.

6. The method of claim 1, wherein said method further includes:

generating an identity key 1 in said first computer system, and generating an identity key 2 in said second computer system;

generating a certificate for said identity key 1, and generating a certificate for said identity key 2; and generating a first certificate for said base chip key 1 using said identity key 1, and generating a first certificate for said base chip key 2 using said identity key 2.

7. A computer program product residing on a computer usable medium for migrating a base chip key from a first computer system to a second computer system, said computer program product comprising:

program code means for generating a second certificate for said base chip key 1 by a manufacturer of said second computer system using a first certificate for said base chip key 1, and generating a second certificate for said base chip key 2 by a manufacturer of said first computer system using a first certificate for said base chip key 2;

program code means for sending a first data packet from said first computer system to said second computer system, wherein said first data packet includes all data necessary to reproduce said base chip key 1 in said second computer system;

program code means for sending a second data packet from said second computer system to said first computer system acknowledging the receipt of a copy of said base chip key 1;

program code means for erasing said base chip key 1 from said first computer system; and program code means for replacing said base chip key 2 in said second computer system with said base chip key 1.

8. The computer program product of claim 1, wherein said first data packet includes a first random number.

9. The computer program product of claim 1, wherein said first data packet is encrypted with said base chip key 1's public key.

10. The computer program product of claim 1, wherein said second data packet includes said first random number and a second random number.

11. The computer program product of claim 1, wherein said second data packet is signed by said base chip key 2.

12. The computer program product of claim 1, wherein said computer program product further includes:

program code means for generating an identity key 1 in said first computer system, and generating an identity key 2 in said second computer system;

program code means for generating a certificate for said identity key 1, and generating a certificate for said identity key 2; and program code means for generating a first certificate for said base chip key 1 using said identity key 1, and generating a first certificate for said base chip key 2 using said identity key 2.

* * * * *